No. 611,377. Patented Sept. 27, 1898.
B. W. DAVIS.
PNEUMATIC BICYCLE SADDLE.
(Application filed Mar. 10, 1897.)

(No Model.) 2 Sheets—Sheet 1.

Witnesses
John H. Holt
J. Stephen Ginsta.

Inventor
B. W. Davis,
By Whitman & Wilkinson
Attorneys.

No. 611,377. Patented Sept. 27, 1898.
B. W. DAVIS.
PNEUMATIC BICYCLE SADDLE.
(Application filed Mar. 10, 1897.)
(No Model.) 2 Sheets—Sheet 2.

Witnesses
L. H. Blakelock.
John C. Wilson.

Inventor
B. W. Davis,
by Whitman & Wilkinson,
Attorneys.

THE NORRIS PETERS CO., PHOTO-LITHO., WASHINGTON, D. C.

UNITED STATES PATENT OFFICE.

BENJAMIN W. DAVIS, OF PHILLIPS, WISCONSIN.

PNEUMATIC BICYCLE-SADDLE.

SPECIFICATION forming part of Letters Patent No. 611,377, dated September 27, 1898.

Application filed March 10, 1897. Serial No. 626,863. (No model.)

*To all whom it may concern:*

Be it known that I, BENJAMIN W. DAVIS, a citizen of the United States, residing at Phillips, in the county of Price and State of Wisconsin, have invented certain new and useful Improvements in Pneumatic Bicycle-Saddles; and I do hereby declare the following to be a full, clear, and exact description of the invention, such as will enable others skilled in the art to which it appertains to make and use the same.

My invention relates to improvements in bicycle-seats and seats for various other purposes, and has for its object to provide an improved pneumatic seat which possesses many advantages over the pneumatic seats or other seats for similar purposes now in use.

My invention consists of the novel features and combinations hereinafter described and claimed, and will be understood by reference to the accompanying drawings, wherein similar parts are indicated by similar letters throughout the several views.

Figure 1:
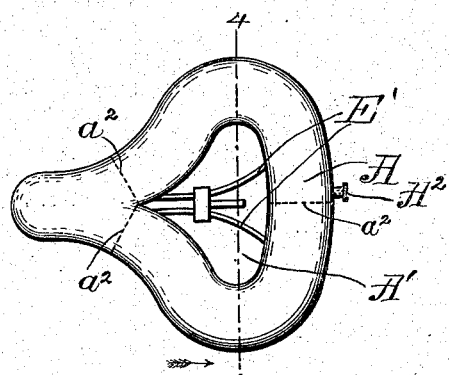
Figure 2:
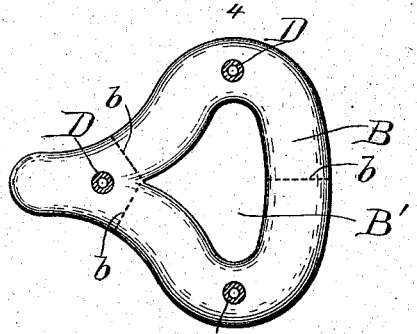
Figure 3:
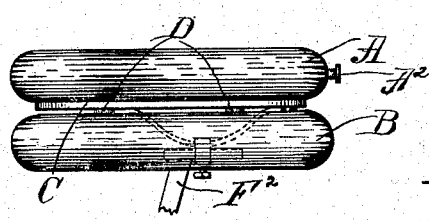
Figure 5:
Figure 4:
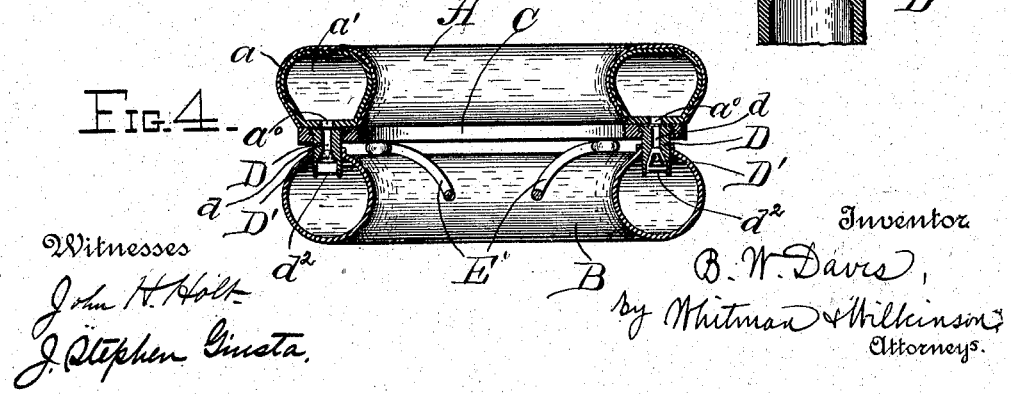
Figure 6:
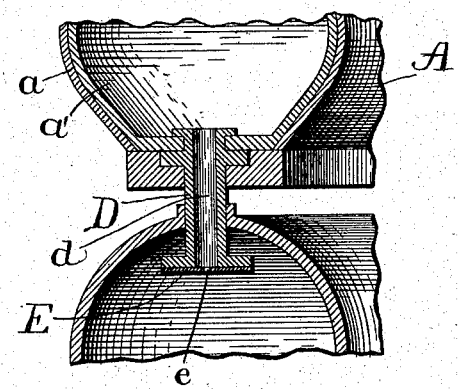
Figure 7:
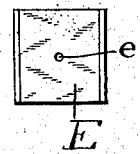
Figure 8:
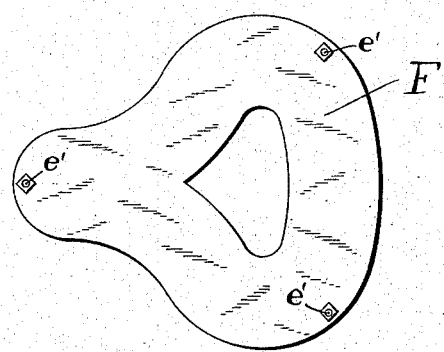
Figure 9:
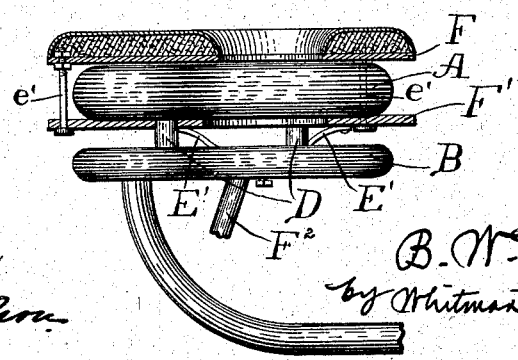

Figure 1 represents a top plan view of one form of my improved seat. Fig. 2 represents a top plan view of the bottom air-reservoir or expansion-tube, the hollow connections being shown in section. Fig. 3 represents the pneumatic seat in side elevation. Fig. 4 represents an enlarged cross-section through the seat, taken on the line 4 4 in Fig. 1 and looking in the direction of the arrow. Fig. 5 represents an enlarged vertical section through one of the valve-tubes and the valve therein. Fig. 6 is an enlarged partial sectional view showing a modified form of valve-tube and valve. Fig. 7 is a detail plan view of the valve shown in Fig. 6. Fig. 8 is a plan view of a seat-frame for use with the form of saddle shown in Fig. 9; and Fig. 9 is a side view, partly in section and partly in elevation, of another form of saddle embodying my invention.

In the construction of pneumatic seats and cushions as now generally used it has ordinarily been the practice to employ only one inflated bag or tube, or when more than one bag or tube has been used they have been isolated from each other with respect to the air connection between them, or the bag or tube was composed of various cells so connected as to be practically one large chamber. While such a structure would lessen the shock experienced by the rider to some degree, the recoil in such a structure is often great enough to throw the person entirely off the seat. To obviate this recoil, as well as reduce to a minimum the shock experienced by the rider or person occupying the seat, is the object of this present invention, and in order to accomplish this result my improved seat is constructed as follows:

A represents an air-cushion consisting of an inner tube of rubber $a$, covered with a leather casing $a'$. This cushion A constitutes the top or seat cushion and is of any suitable shape, such as heart-shaped, with a central opening $A'$, as shown in Fig. 1. The cushion A may either be provided with one or more partitions $a^2$, as shown in dotted lines in Fig. 1, or may be one continuous air-chamber, as preferred. This cushion is preferably flattened on one side in such a manner as to be easily secured to the seat-frame C.

Where the cushion is divided into compartments by partitions, as above referred to, a small hole through each partition affords a communication between all of the compartments, but restricts the passage of the air from one to the other to such an extent as to prevent a rapid or sudden collapse of any one compartment. This arrangement allows the compartments to all be inflated from a single valve, while it renders them practically independent of each other, and is particularly advantageous in large cushions.

The seat-frame may be of either wood or metal, as preferred, and of a shape to conform to that of the seat-cushion. The cushion A is inflated through the valve $A^2$, which may be of any form and location suitable for such purposes.

B represents a rubber air-tube located beneath the seat-cushion A and frame C, and connected to the said seat-frame and cushion by means of a plurality of hollow tubes D, having central openings $d$, provided with valve-seats therein. Valves $D'$ are mounted in said tubes, and each valve is provided with a small passage $d'$ therethrough, as shown in Fig. 5. This passage in the valve is small enough to allow the downward pressure of the air to displace the valve, but to cause the valve to return to its seat when air begins to return from the lower tube B back to the tube A and then allow the air to slowly return from the tube B to the tube A until the pressure from above and below has become equal, when the valve will fall upon the cross-wires $d^2$ and leave a free passage for the air downward.

The upper cushion A communicates with the tube B through the passages $a^0$ and the valve-ports $d$, there being a valve-port communicating with each compartment of the said cushion.

The air-tube or expansion-reservoir B is made of rubber sufficiently thin to be much more susceptible to expansion than the seat-cushion A, and may be of any desired form, according to conditions or the character of the seat. If used with a bicycle-seat, as shown in Figs. 2, 3, and 4, this expansion-tube would ordinarily be made to conform to the shape of the seat-cushion A, and may or may not be divided into compartments by means of perforated partitions $b$, (indicated by dotted lines in Fig. 2,) similar to the partitions $a^2$ in the seat-cushion above described.

Instead of the conical valve shown in Figs. 4 and 5 I may use a flap-valve E, provided with a central perforation $e$, as shown in Figs. 6 and 7, if preferred.

In Fig. 9 I have illustrated a saddle wherein the seat-cushion is mounted between two frames connected by sliding bolts, which allow the upper frame to rise and fall with the weight of the person. The upper frame F may or may not be padded, as shown, while the lower frame F' may be of any suitable rigid material of sufficient strength and mounted upon the seat-post $F^2$ by means of rods or springs E', as is also the seat shown in Figs. 1, 3, and 4. The rods $e'$ are preferably fixed to the upper seat-frame and slide in openings in the lower frame F'. In Fig. 9 I have also shown a portion of an additional rubber tube which opens into the tube B and may be of any desired length and coiled or stowed upon the seat or vehicle in any convenient manner. In this case the tube D is not so large as when such additional tube is not used.

The cushion A and the expansion-tube B having been inflated, the action of the seat is as follows: A sudden downward pressure upon the cushion A compresses the air therein and causes a portion of such air to pass through the valve-ports into the tube B, which, being thin, will be distended somewhat. When the pressure upon the cushion A is relieved or removed, the air in the tube B, rushing back again to the cushion A, will close the valves immediately, and the air will pass back again to the cushion A through the perforations in the valves so slowly that the said cushion will be filled again gradually and there will be no sudden recoil. Thus the cushion A will give readily to pressure, but will not rebound so suddenly as to be disagreeable or uncomfortable to the person sitting thereon.

I do not wish to limit myself to the precise details of construction herein shown and described, as many modifications of my invention might be made which could be used without departing from the spirit of my invention.

Having thus described my invention, what I claim, and desire to secure by Letters Patent of the United States, is—

1. In a pneumatic seat for bicycles, the combination of a supporting-frame, an elastic pneumatic cushion comprising two fluid-chambers, and means connected to said chambers for permitting the free passage of the fluid in one direction, and restricting its passage in the opposite direction, substantially as described.

2. In a pneumatic seat for bicycles the combination with a seat, of an elastic support therefor comprising two fluid-chambers and an intermediate connecting-passage between the chambers, said passage provided with means for permitting free passage of the fluid in one direction and preventing its free passage in another direction from one of said chambers to the other, substantially as described.

3. In a pneumatic seat for bicycles, the combination with an elastic air-cushion, of a seat-frame supporting said cushion, an expansible air-receptacle attached to and communicating with said cushion by air-passages, valves mounted in said passages and adapted to admit the flow of air under pressure in said passages in one direction and retard its flow in the opposite direction, and means for inflating said cushion and air-receptacle, substantially as described.

4. In a pneumatic seat for bicycles the combination with a hollow cushion divided into compartments and capable of being inflated, of a seat-frame supporting said cushion, an expansible air-receptacle beneath said cushion; air-passages connecting the said cushion and air-receptacle, and means for admitting the flow of air under pressure from the cushion to the receptacle and restricting its return from the receptacle to the cushion, and means for inflating said cushion and reservoir, substantially as described.

5. In a pneumatic seat for bicycles, the combination with a hollow cushion divided into communicating compartments and capable of being inflated, of a seat-frame supporting said cushion, an expansible air-receptacle beneath said cushion and also divided into communicating compartments, air-passages connecting the said cushion and air-receptacle, a perforated valve so arranged at one end of each of said air-passages as to allow free passage of air from said cushion to said air-receptacle, but to restrict the passage of the air in the reverse direction, and an inflating-valve attached to said cushion, substantially as described.

In testimony whereof I affix my signature in presence of two witnesses.

BENJAMIN W. DAVIS.

Witnesses:
 E. J. RIORDAN,
 M. CHRISTIANSON.